(12) United States Patent
Choo et al.

(10) Patent No.: US 8,673,802 B2
(45) Date of Patent: Mar. 18, 2014

(54) CATALYST FOR CATALYTIC CRACKING OF HYDROCARBON, WHICH IS USED IN PRODUCTION OF LIGHT OLEFIN AND PRODUCTION METHOD THEREOF

(75) Inventors: Dae Hyun Choo, Busan (KR); Hong Chan Kim, Daejeon (KR); Suk Joon Kim, Daejeon (KR); Ji Min Kim, Daejeon (KR); Tae Jin Kim, Daejeon (KR); Sun Choi, Daejeon (KR); Seung Hoon Oh, Seoul (KR); Yong Seung Kim, Seoul (KR); Deuk Soo Park, Goyang-si (KR); Yong Ki Park, Daejeon (KR); Chul Wee Lee, Daejeon (KR); Hee Young Kim, Daejeon (KR); Won Choon Choi, Daejeon (KR); Na Young Kang, Chungcheongnam-do (KR); Bu Sub Song, Daejeon (KR)

(73) Assignees: SK Innovation Co., Ltd., Seoul (KR); Korea Research Institute of Chemical Technology, Daejeon (KR)

( * ) Notice: Subject to any disclaimer, the term of this patent is extended or adjusted under 35 U.S.C. 154(b) by 192 days.

(21) Appl. No.: 12/735,647

(22) PCT Filed: Feb. 5, 2009

(86) PCT No.: PCT/KR2009/000573
§ 371 (c)(1),
(2), (4) Date: Nov. 4, 2010

(87) PCT Pub. No.: WO2009/099309
PCT Pub. Date: Aug. 13, 2009

(65) Prior Publication Data
US 2011/0039688 A1 Feb. 17, 2011

(51) Int. Cl.
*B01J 29/06* (2006.01)
(52) U.S. Cl.
USPC .................. 502/60; 502/73; 502/77; 502/78; 502/79
(58) Field of Classification Search
USPC .................... 502/60, 73, 77, 78, 79
See application file for complete search history.

(56) References Cited

U.S. PATENT DOCUMENTS

| | | |
|---|---|---|
| 4,956,075 A | 9/1990 | Angevine et al. |
| 4,977,122 A | 12/1990 | Eberly |
| 5,039,644 A | 8/1991 | Lachman et al. |
| 5,380,690 A | 1/1995 | Zhicheng et al. |
| 5,670,037 A | 9/1997 | Zaiting et al. |
| 6,080,303 A | 6/2000 | Cao et al. |
| 6,080,698 A | 6/2000 | Zhang et al. |
| 6,211,104 B1 | 4/2001 | Shi et al. |
| 6,447,741 B1 | 9/2002 | Chester et al. |
| 6,613,710 B2 | 9/2003 | Ray et al. |
| 6,835,863 B2 | 12/2004 | Chester et al. |
| 2005/0020867 A1 | 1/2005 | Xie et al. |
| 2006/0011513 A1 | 1/2006 | Kumar |
| 2006/0116544 A1 | 6/2006 | Wakui et al. |
| 2007/0209969 A1* | 9/2007 | Shen et al. ............. 208/133 |

FOREIGN PATENT DOCUMENTS

WO WO2005/094992 10/2005

OTHER PUBLICATIONS

Office Action issued by the Japanese Patent Office dated Mar. 26, 2013.

* cited by examiner

*Primary Examiner* — Elizabeth Wood
(74) *Attorney, Agent, or Firm* — Abelman, Frayne & Schwab

(57) ABSTRACT

Disclosed are a molecular sieve catalyst and a preparation method thereof to produce light olefins from cracking naphtha catalytically in severe environments of high temperature and high moisture. In detail, the catalyst is prepared by spray-drying and calcining the mixed slurry, in which 0.01~5.0 wt % of $MnO_2$ and 1~15 wt % of $P_2O_5$ are simultaneously imbedded in catalyst which consists of zeolite, clay and inorganic complex. According to the present invention, the method that manganese and phosphate are imbedded simultaneously in zeolite and inorganic complex is used to increases thermal-stability of obtained spherical catalyst, and increase olefin yield of cracking hydrocarbon such as naphtha by protecting acid-site of zeolite. To synthesize the required catalyst, the important procedures are mixing ratio and mixing sequence of Mn, P, zeolite, and inorganic complex.

12 Claims, 1 Drawing Sheet

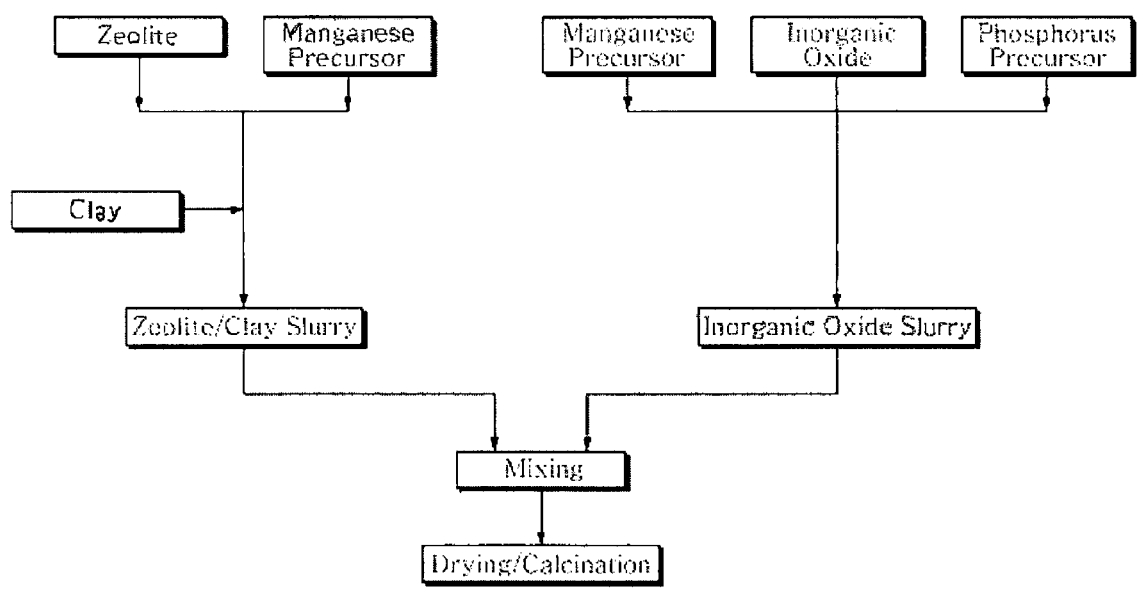

CATALYST FOR CATALYTIC CRACKING OF HYDROCARBON, WHICH IS USED IN PRODUCTION OF LIGHT OLEFIN AND PRODUCTION METHOD THEREOF

TECHNICAL FIELD

The present invention relates to a hydrothermally stable porous molecular sieve catalyst and a preparation method thereof, and more particularly to a hydrothermally stable porous molecular sieve catalyst, which, even in an atmosphere of high temperature and humidity, has a relatively stable structure and can maintain its catalytic activity, and a method of preparing the same.

BACKGROUND ART

Porous inorganic materials having a framework of —Si—OH—Al— groups have been widely used in the field of porous molecular sieve catalysts because they have abundant pores, large specific surface area, and many active sites and acid sites.

This porous molecular sieve catalyst is used in, for example, heterogeneous catalytic reactions, such as various oxidation/reduction reactions, including catalytic cracking reactions, isomerization reactions and esterification reactions, particularly heterogeneous catalytic reactions requiring thermal stability under a severe atmosphere of high temperature and humidity. In this case, however, the catalyst has problems in that, when it is placed in a steam atmosphere of more than 500° C., dealumination of its tetrahedral framework will occur, leading to its structural breakdown, and at the same time, the acid sites of the catalyst will be reduced, resulting in a rapid reduction in catalytic activity. Additionally, since high mechanical strength is required for these microporous molecular sieve catalysts in order to be used in massive fluidized catalytic petrochemical processes for naphtha catalytic cracking, inorganic complex and matrix(clay) are used for producing spherical catalysts in these area.

Therefore, since microporous molecular sieve catalyst comprising many components such as bonding agent, matrix, and porous molecules, maintaining thermal-stability for the respective component is one of the most important factors to produce proper microporous molecular sieve catalyst. For example, the collapse of matrix structure, which is used for microporous molecular sieve catalyst, decreases drastically the reaction rate of naphtha catalytic cracking.

In other hand, in order to achieve high yield of ethylene and propylene in naphtha catalytic cracking process, it is required to control the characteristic of acid site in microporous molecular zeolite. If the amount of acid site is large or strength of acidity is strong relatively, dehydrogenation reaction is faster, and so the yield of saturated hydrocarbons such as methane and aromatics such as benzene, toluene and xylene, increases.

On the other hand, if the amount of acid site is small or strength of acidity is weak relative, conversion of hydrocarbon decreases and so light olefins decrease.

As mentioned above, in order to produce light olefins effectively from hydrocarbons such as naphtha by catalytic cracking using catalyst, many characteristics of catalyst are required. Specially, the thermal-stability is considered to be the most important factor because the catalytic cracking catalyst is operated in conditions of high temperature and high humidity. Many researches have been proposed to increase thermal-stability.

Regarding these methods, U.S. Pat. No. 5,039,644 discloses a method using phosphate in preparing a catalyst which is stable in high temperature, which comprises 0.5~15 wt % of $P_2O_5$ imbedded in porous metal oxides such as $TiO_2$, $ZrO_2$, $TiO_2$—$ZrO_2$ mixture, $TiO_2$—$Al_2O_3$ mixture, or $ZrO_2$—$Al_2O_3$ mixture. However, this patents does not explain how to achieve high yield of light olefins from catalytically cracking hydrocarbons using zeolite.

U.S. Pat. No. 4,977,122 discloses a hydrothermally stable catalyst, which comprises: (a) a crystalline zeolite; (b) an inorganic oxide matrix (e.g., silica, alumina, silica-alumina, magnesia, zirconia, titania, boria, chromia, clay, etc.); and (c) discrete particles of phosphorus-containing alumina also dispersed in said matrix, said discrete particles having been prepared by contacting alumina with a phosphorus compound selected from the group consisting of an alkaline earth metal salt (Be, Mg, Ca, Sr, Ba) of phosphoric acid or phosphorous acid and mixtures thereof.

U.S. Pat. No. 6,835,863 discloses a process for producing light olefins by catalytically cracking naphtha (boiling point: 27-221° C.) using a pelletized catalyst containing 5-75% by weight of ZSM-5 and/or ZSM-11, 25-95% by weight of silica or kaolin and 0.5-10% by weight of phosphorus. However, there is no mention of the specific phosphorus starting material or of the hydrothermal stability of the molded catalyst.

Meanwhile, U.S. Pat. No. 6,211,104 discloses a catalyst for catalytic cracking, which comprises 10-70 wt % of clay, 5-85 wt % of inorganic oxides and 1-50 wt % of zeolite. The zeolite used in the catalyst consists of 0-25 wt % of Y-zeolite or REY-zeolite and 75-100 wt % of pentasil zeolite ($SiO_2$/$Al_2O_3$=15-60; selected from ZSM-5, ZSM-8 and ZSM-11 zeolites containing 2-8 wt % of $P_2O_5$ and 0.3-3 wt % of $Al_2O_3$ or MgO or CaO), in which the starting materials of said aluminum or magnesium or calcium compounds are selected from aqueous solutions of their nitrates, hydrochloride, or sulfates. Particularly, the catalyst is described as showing excellent olefin production even when pretreated in an atmosphere of 100% steam at 800° C. for 4-27 hours. However, in said patent, technology for adjusting/selecting and loading the specific chemical species of P is not disclosed, the added metals are limited to Al, Mg and Ca, and a conventional water-soluble metal salt is used so that the Al, Mg or Ca cations, which are generated during the preparation of the catalyst, can be easily ion-exchanged with the protons of zeolite, resulting in the loss of acidic sites. For this reason, it is believed that it is not easy to prepare the catalyst proposed in said patent under the specified synthesis conditions.

In US publication No. 2005/0020867 A1, the catalyst for light olefin production is disclosed, said catalyst is prepared by the steps comprising that ZSM-5 treated with $P_2O_5$ 1~10 wt.% RE2O3 0~10 wt. %, transition metal (Fe, Co, Ni, Cu, Zn, Mo, Mn) oxides 0.7~15 wt. % is completed by drying and calcination, and then mixed with clay and inorganic bonding agents (silica, alumina, silica-alumina), followed by spray drying. The present ZSM-5 is silica-rich (higher Si/Al ratio) that may reduce aromatization and hydrogen transfer reaction. However, the silica-rich ZSM-5 is not economic for its complicated synthetic method, weak for matrix performance and structural stability by severe thermal treating with inorganic bonding agents and clay which are not stable at high temperature steaming. It may cause reducing catalytic cracking activity of zeolite.

In the U.S. Pat. No. 6,613,710, P-modified clay 40~80 wt. %, semi-basic alumina 1~20 wt. %, and ZSM-5 0.5~15 wt. % are used for the catalyst of catalytic cracking reaction. P-modified clay are formed from treating clay and phosphoric acid at 15~40° C. for 1~16 hours, semi-basic alumina from slurry of sodium aluminate and aluminum sulfate at pH 7.5~9. The present catalyst yields more LPG in residual oil cracking within b.p. 315~528° C. This patent is not for host catalyst but for additive catalyst technology of LPG booster, and there is no disclosure of hydrothermal stabilization improvement and production of light olefins.

In U.S. Pat. No. 5,670,037, ZSM-5 modified with rare earth metal, calcined by aluminum phosphate sol is proposed for hydrocarbon catalytic cracking to increase light olefin yield. It is prepared by mixing of $P_2O_5$ and zeolite (wt. ratio of $P_2O_5$ to zeolite is 1:5~99) in aluminum phosphate solution, drying, calcining, and steaming. The completed catalyst is made of zeolite 10~35 wt. %, inorganic oxides ($Al_2O_3$, $SiO_2$, $Al_2O_3$—$SiO_2$) 5~90 wt. %, and clay 0~70 wt. %. Aluminum phosphate solution is used for treating zeolite, and there is no explanation of the yield increment of light olefins without the usage of rare earth metal.

In the U.S. Pat. No. 6,080,698, the pentasil-type zeolite catalyst for production of light olefin by hydrocarbon catalytic cracking is prepared by ZSM-5 ($SiO_2/Al_2O_3$=15~60) treated $P_2O_5$ 1~10 wt. %, alkaline earth metal oxides 0.3~5 wt. %, and transition metal oxides 0.3~5 wt. %. The results with Mg, Ni, Zn, Cu, and Ca for treatment of zeolite are reported, while the result with manganese oxide is not explained. The phosphorus is limitedly used to only modify zeolite with transition metal.

In the U.S. Pat. No. 6,080,303, the zeolite catalyst for production of light olefin by hydrocarbon catalytic cracking is prepared by treating with aluminum phosphate ($AlPO_4$). The catalyst is prepared by 1) making and calcining ZSM-5 with modified with phosphorus, 2) forming $AlPO_4$ by mixing $Al(NO_3)_3$ and $NH_4(H_2PO_4)$ at pH 7~9, 3) treating phosphorus based ZSM-5 with $AlPO_4$ and calcining. For treatment using $AlPO_4$, both of dried state and wet gel state for $AlPO_4$ may be possible. The completed catalyst has a composition comprising of P 0.5~10 wt. %, $AlPO_4$ 1~50 wt. %, zeolite 5~60 wt. %, and balanced binder or clay. In the present patent, P and $AlPO_4$ are used to improve hydrothermal stabilization of zeolite, and the advantage of the result of hydrothermal treatment of n-hexane is explained. However, there is no result before hydrothermal treatment, and no explanation of the stabilization technology of binder and clay as P and $AlPO_4$ are only used for treating zeolite.

In US Patent 2006/0011513 A1, the catalyst made of ZSM-5, Beta, Mordenite, Ferrierite, and zeolite (silica/alumina>12), which is treated with the mixed binder of aluminum phosphate salts and metal phosphate salts, is proposed as an additive in FCC process. The metal phosphate salts as binder are selected from IIA group, lanthanoids group, Sc, Y, La, Fe, La, and Ca, and the content of phosphate is more than 5 wt. %, and 4~50 wt. % is included in typical cases. In this patent, there is not shown chemical structures of phosphate salts, which is not for active sites but for binders. Furthermore, there is also not disclosed of improvement of olefin yield by using zeolite formed with manganese.

In the U.S. Pat. No. 5,380,690, catalyst which comprises clay 0~70%, inorganic oxides such as $Al_2O_3$, $SiO_2$, $Al_2O_3$—$SiO_2$ 5~99%, and zeolite 1~50% is disclosed, said catalyst is pentasil zeolite catalyst with Y zeolite 0~25%, $P_2O_5$ 75~100%. ZSM-5. Said catalyst is prepared by uniformly mixing ZSM-5 modified from $Re_2O_3$ 1~30% with aluminum phosphate solution ($Al_2O_3$:$P_2O_5$=1:1~3, wt. ratio, $P_2O_5$: zeolite=1:5~99), calcining, and steaming.

In the US patent 2006/0116544, it reports that by treating pentasil type zeolite within rare earth metal and manganese or zirconium with phosphorus, hydrothermal stability and yield of light olefin are improved. It is required that manganese or zirconium is included together with rare earth metal and phosphorus in zeolite in order to improve the yield of light olefin. Furthermore, direct injection of rare earth metal and manganese or zirconium and phosphorus in zeolite is used as treating method. The purpose of this technology is structural improvement like the previous ones, and there are no comments about stabilization of inorganic binders or matrix contents.

In the U.S. Pat. No. 4,956,075, the Y zeolite catalyst treated with manganese and rare earth metal is proposed for hydrocarbon catalytic cracking for gasoline with higher octane number. However, the catalyst has less yield of light olefins and hydrothermal stability than pentasil type catalysts.

Addition of manganese to ZSM-5 may improve hydrothermal stability, reporting in "Studies in Surface Science and Catalysis", V105, 1549(1996). However, there is only explanation of hydrothermal stability, no explanation for production of light olefins by hydrocarbon catalytic cracking.

In the U.S. Pat. No. 6,447,741, aluminophosphate treated by manganese is used for catalyst of catalytic cracking, while there are no results of synthesis of catalyst and application for hydrocarbon cracking. In addition, in this patent, it is not considered for hydrothermal stability and catalytic characteristics of zeolite, clay and binder.

As explained above, transition metals such as manganese, phosphate and rare earth metals have been proposed to increase thermal-stability of catalysts and high yield of light olefins from hydrocarbon catalytic-cracking. However, there is no previous report which explains systematically how to prepare the catalysts for high thermal-stability and high yield of light olefins. That is, there is no previous report as proposed by the present invention, which describes imbedding acid site of zeolite by manganese, stabilizing inorganic complex and matrix by phosphate and manganese in order to maintain the catalyst activity for long period and increase yield of light olefins. Also, this present invention shows cost-effective procedure for manufacturing catalyst by eliminating complex imbedding step and complex processing spherical catalyst.

As described in above comparative patents, phosphate show high ability to increase thermal-stability of zeolite catalyst. Phosphate increases thermal-stability by stabilizing Al through acting as phosphate ion ($[PO_4]^{3-}$) in —Si—OH—Al— frame which is Bronsted acid site and dealuminated by steam.

However, thermal-stability is affected strongly by how to introduce phosphate into zeolite. In order to introduce phosphate into zeolite to increase thermal-stability, previous methods tried to inject phosphoric acid directly into zeolite. However, large amount of acid sites are lost according to these methods. Another method is to use phosphoric acid and rare-earth metals, such as La, together. In this method, large size of $La^{3+}$ or phosphoric acid decreases the reaction activity by positioning at entrance of zeolite pore. Additionally since the previous methods tries to make only zeolite itself thermally stable, the problem is that the microporous molecular sieve catalyst made by the zeolite does not have sufficient thermal-stability.

Therefore, the present intention discloses ① a method to stabilize the catalyst for long period in circumstances of high temperature and high humidity, ② a method to maximize yield of light olefins by maintaining acid sites of catalyst after imbedding.

DISCLOSURE

Technical Problem

The present invention provides a cracking catalyst using components to stabilize the inorganic oxide binder and matrix component added to obtain mechanical strength along with maintaining the structure of zeolite, which is a main catalyst component, under high temperature and high humidity for preparing the cracking catalyst with thermal-stability.

An aspect of the present invention provides a method of preparing the catalyst, which is easy for mass production and economical due to simple synthesis process, unlike the existing method of preparing the catalyst.

Technical Solution

A hydrocarbon cracking catalyst for preparing light olefin from C4 or more than C4 hydrocarbon, which is characterized in that 0.01~5.0 wt % of $MnO_2$ and 1~15 wt % of $P_2O_5$ are simultaneously supported on a catalyst component, wherein the catalyst component comprises 1~50 wt % of zeolite, 21~70 wt % of clay, and 1~40 wt % of an inorganic oxide.

A method of preparing the cracking catalyst for preparing light olefin from C4 or more than C4 hydrocarbon, the method comprising the steps of:

(a) Mixing zeolite, clay and inorganic oxide precursor with phosphorus precursor and manganese precursor with stirring to prepare a mixing slurry; and (b) spray drying the mixing slurry, followed by calcinations.

Advantageous Effects

The present invention not only improves thermal-stability of the catalyst by imbedding manganese and phosphorus in the catalyst comprising zeolite, inorganic oxide and clay simultaneously, but also obtains high yield of light olefin in catalytically cracking hydrocarbons more than C4 such as naphtha by protecting acid-site of zeolite. Due to simple method of preparing the catalyst, it is easy and economical for mass production.

DESCRIPTION OF DRAWINGS

FIG. 1 is a schematic diagram of manufacturing the catalyst of this present invention.

BEST MODE

Compared to the previous inventions, the present intention discloses a new method to achieve simpler catalyst manufacturing, high thermal-stability, and high yield of light olefins in the area of producing light olefins from cracking hydrocarbons catalytically.

The method of manufacturing the catalyst of the present inventions is followed:

1. For preparing microporous molecular sieve catalyst, the maximal protection of acid sites of zeolite are accomplished by imbedding manganese salt into zeolite in the step of processing slurry of microporous molecular sieve catalyst and by not using the zeolite which previously is imbedded by manganese before slurry processing.

2. In order to increase mechanical strength of microporous molecular sieve catalyst, the present invention stabilizes inorganic complex by injecting proper amount of phosphorus and manganese contents in the step of processing slurry of inorganic complex.

3. By mixing zeolite slurry, inorganic complex slurry and clay in final, manganese and phophorus contents could be imbedded in clay, zeolite and inorganic oxide simultaneously so that the stability and activity of decomposition is accomplished to be maximized.

As described above, although it is well known that injection of phosphate or transition metals into zeolite to stabilize the catalyst structure, the present invention firstly disclosed the effective method to stabilize inorganic complex and clay, and maintain the acid sites of zeolite maximally by imbedding simultaneously manganese and phosphorus into zeolite in the step of processing slurry, not in the previous steps of processing zeolite directly, in order to obtain high yield of light olefins in catalytically cracking hydrocarbons more than C4.

The catalyst disclosed by the present invention for producing light olefins from hydrocarbons more than C4 is manufactured by imbedding simultaneously 0.01~5.0 wt % of $MnO_2$ and 1~15 wt % of $P_2O_5$ into catalyst components which comprise 1~50 wt % zeolite, 21~70 wt % clay, and 1~40 wt % inorganic oxide.

The catalytic cracking catalyst described above is prepared by the following steps: (a) making mixed slurry by mixing phosphate precursor and manganese precursor into zeolite, clay and inorganic oxide precursor; (b) calcining the above mixed slurry after spray-drying.

In the examples of this present invention, the mixed slurry, in which phosphate precursor and manganese precursor are mixed into zeolite, clay and inorganic oxide precursor, is prepared, as illustrated in FIG. 1, by steps comprising (i) manufacturing slurry of zeolite and clay by adding and mixing clay after mixing zeloite and manganese precursor; (ii) manufacturing inorganic oxide slurry by mixing phosphate precursor and manganese precursor into inorganic oxide precursor; and (iii) mixing uniformly the above zeolite/clay slurry and inorganic oxide slurry.

In another examples prepared by this present invention, the mixed slurry, in which phosphate precursor and manganese precursor are mixed into zeolite, clay and inorganic oxide precursor, is prepared by steps comprising (i) manufacturing zeolite slurry by mixing zeolite and manganese precursor; (ii) manufacturing inorganic oxide slurry by mixing phosphate precursor and manganese precursor into inorganic oxide precursor; and (iii) mixing uniformly the above zeolite slurry, clay slurry and inorganic oxide slurry.

In another examples prepared by the present invention, the mixed slurry, in which phosphate precursor and manganese precursor are mixed into zeolite, clay and inorganic oxide precursor, is prepared by simultaneously mixing zeolite, clay inorganic oxide precursor, phosphate precursor and manganese precursor.

Finally, after spray-drying the above mixed slurry, the catalyst for catalytic cracking by the present invention is prepared by calcining 5~10 hours in 500~700° C.

The catalyst prepared by this method has not only improved hydrothermal stability but higher light olefin yield in hydrocarbon catalytic cracking, protecting acid sites in zeolite. Activity cannot be guaranteed if the ratio of each component of manganese, phosphorus, zeolite and inorganic oxides in slurry formation for spray drying and mixing progress are not proper.

Zeolite may be selected from the group consist of ZSM-5 (Si/Al<200, mole base), ZSM-11, Ferrierite, Mordenite, MCM-22, SUZ-4, X-, Y-, and L-Zeolite. Zeolite with Si/Al>200 may reduce activity by little acid sites, and the synthesis for such zeolite is not economical. Following the present research, the quantity of zeolite used is 1~50 wt % based on whole catalyst weight.

Manganese precursor in this invention could be the one of sulfate, nitrate, chloride, and acetate of manganese, and preferable precursors are chloride and acetate of manganese.

Improvement of light olefin yield is achieved by protecting acid sites of zeolite possibly through agitating with manganese precursor in slurry mixture preparation step of zeolite, clay and inorganic oxides, or zeolite slurry preparation step.

It is desirable to use Mn precursor that the $MnO_2$ is about 0.01~5.0 wt % based on the final catalyst weight. In case that $MnO_2$ is less than 0.01 wt %, the protection of acid center and hydrothermal stability decrease. In case that $MnO_2$ is higher than 5.0 wt %, acid center sharply decreases to lower the activity of catalyst.

For current invention, clay can be used in the range of 21~70 wt % based on the final catalyst weight. In case that the amount of clay is less than 21 wt %, there are many problems of controlling the physical properties such as wear strength and specific gravity. In case that the amount of clay is higher than 70 wt %, catalyst activity could be decreased.

For the present invention, $Al_2O_3$, $SiO_2$ or $Al_2O_3$—$SiO_2$ could be used as the binder of inorganic oxidized precursor. For inorganic oxide precursor of catalytic cracking catalyst in current invention, inorganic oxide precursor has the form of sol, gel or solution including $Al_2O_3$, $SiO_2$, or $Al_2O_3$—$SiO_3$. The desirable amount of the inorganic oxide is in the range of 1~40 wt % based on the final catalyst. When the amount of the inorganic oxide is less than 1 wt %, the wear strength of micro-spherical catalyst could be insufficient, whereas in the case that the amount of inorganic oxidized substance is higher than 40 wt %, the activity of catalytic cracking catalyst decreases For phosphorus precursor of the present invention, it can be used of the aqueous compound which is selected from the group of $H_3PO_4$, $(NH_4)_3PO_4$, $H(NH_4)_2(PO_4)$ and $H_2(NH_4PO_4)$, and it is desirable for its contents to have $P_2O_5$ content of the final catalyst to be in the range of 1~15 wt %. In the case that $P_2O_5$ content of the final catalyst is less than 1 wt %, the hydrothermal stability of zeolite decreases, whereas in the case that $P_2O_5$ content of the final catalyst is higher than 15 wt %, the activity of catalytic cracking decreases due to the excess loss of acid center.

Phosphorus and manganese contained in mixed slurry are in the dissolved form, imbedded to all of zeolite, clay and inorganic oxidized substance. These components protect the acid center of zeolite and increase the hydrothermal stability of zeolite, clay and inorganic oxidized substance to maximize the stability and activity of catalyst.

Finally, the catalyst for catalytic cracking by current invention is prepared by spary-drying and calcining above mixed slurry at 500~700° C. for 5~10 hours.

The prepared catalyst according to the present invention is used as microspheroidal molded catalyst for fluidized catalytic process producing ethylene and propylene from hydrocarbons (carbon number is 4 or above) with high yield and high selectivity. Wherein said hydrocarbons (carbon number is 4 or above) mean hydrocarbons which has boiling point of 30~200° C.

Also, even in the condition of high humidity and high temperature, the catalyst according to the present invention has high cracking activity and stability. Due to this feature, the present catalyst can be used for not only catalytic cracking reaction but also isomerization reaction, alkylation reaction, esterification reaction and oxidation/reduction reaction which require the high hydrothermal stability.

MODE FOR INVENTION

Hereinafter, the present invention will be described in more detail using Examples. It is to be understood, however, that these examples are not to be construed to limit the scope of the present invention Comparative Example 1

Preparation of P—La—Mn/ZSM-5

40.5 g of $MnCl_2.4H_2O$ was dissolved in 3000 mL of distilled water. To the solution, 200 g of ZSM-5 was slowly added with stirring for about 3 hours at the room temperature. Next, the solution was dried with vacuum drying, followed by being calcined (650° C., 6 hours). 89 g of $La(NO_3)_3 6H_2O$ was dissolved in 3000 mL of distilled water, and 200 g of calcined sample was added to the solution, followed by stirring 3 hours at the room temperature. Next the solution was dried with vacuum drying, followed by being calcined (650° C., 6 hours). 25.5 g of 85% $H_3PO_4$ was dissolved in 3000 mL of distilled water and 200 g of calcined sample was added to the solution, followed by stirring 3 hours at the room temperature. Next the solution was dried with vacuum drying, followed by being calcined (650° C., 6 hours).

Comparative Example 2

Preparation of P—Mn/ZSM-5

40.5 g of $MnCl_2.4H_2O$ was dissolved in 3000 mL of distilled water, and 200 g of ZSM-5 was added to the solution, followed by stirring 3 hours at the room temperature. Next the solution was dried with vacuum drying, followed by being calcined (650° C., 6 hours). 25.5 g of 85% $H_3PO_4$ was dissolved in 3000 mL of distilled water and 200 g of calcined sample was added to the solution, followed by stirring 3 hours at the room temperature. Next the solution was dried with vacuum drying, followed by being calcined (650° C., 6 hours).

Comparative Example 3

Preparation of P/ZSM-5

25.5 g of 85% $H_3PO_4$ was dissolved in 3000 mL of distilled water and 200 g of ZSM-5 was added to the solution, followed by stirring 3 hours at the room temperature. Next the solution was dried with vacuum drying, followed by being calcined (650° C., 6 hours).

Comparative Example 4~6

The microsheroidal catalyst for catalytic cracking was prepared with using the sample of comparative example 4-6, with following procedure.

For preparing the zeolite slurry, 120 g sample of comparative example 1 was added to 200 g of distilled water, followed by stirring. For preparing the clay slurry, 144 g of clay was added to 176 g of distilled water, followed by stirring. 439 g of Alumina sol (solid contents 8.4%, pH2~3) was used for binding zeolite and clay to make the microsheroidal catalyst. Zeolite slurry, clay slurry and alumina sol were stirred homogenously, followed by spraying, and drying. Next, thus prepared material was calcined at 650° C. for 6 hours to form the molded catalyst of the comparative example 4. With same procedure and method, molded catalysts of comparative examples 5 and 6 were prepared using zeolite of comparative examples 2 and 3.

Comparative Example 7

For preparing the zeolite slurry, 120 g sample of comparative example 1 was slowly added to 200 g of distilled water, followed by stirring. For preparing the clay slurry, 144 g of clay was slowly added to 176 g of distilled water, followed by stirring. For forming imorgarnic binder to make the microsheroidal catalyst, 439 g of Alumina sol (solid contents 8.4%, pH2~3) and 33.1 g of 85% $H_3PO_4$ were homogeneously mixed. Zeolite slurry, clay slurry and alumina sol-$H_3PO_4$ mixture were stirred homogenously, followed by spraying, drying. Next, this was calcined at 650° C. for 6 hours, and formed the molded catalyst of the comparative example 7.

Chemical compositions of catalyst of comparative example 4-7 are summarized in the below table 1.

TABLE 1

| Catalyst | Comparative example 4 | Comparative example 5 | Comparative example 6 | Comparative example 7 |
|---|---|---|---|---|
| | composition, weight % | | | |
| Zeolite | 29.3 | 33.9 | 37.0 | 27.5 |
| Clay | 47.9 | 47.9 | 47.9 | 44.8 |
| $Al_2O_3$ | 12.3 | 12.3 | 12.3 | 11.5 |
| $SiO_2$ | — | — | — | — |
| $P_2O_5$ | 2.9 | 2.9 | 2.9 | 9.1 |
| LaO | 5.1 | — | — | 4.7 |
| $MnO_2$ | 2.6 | 3.0 | — | 2.5 |

Example 1-2

4.5 g of $MnCl_2.4H_2O$ was added to 376 mL of distilled water, and 120 g of ZSM-5 was added to this solution, followed by stirring at 60° C. for 6 hours. Next, using high viscosity slurry mixer, 144 g of clay was slowly added to this solution and stirred for 3 hours. For preparing inorganic binder, 439 g of alumina sol (solid contents 8.4%, pH2~3), 30.5 g of 85% $H_3PO_4$ and 1.8 g of $MnCL_2.4H_2O$ were mixed at 35° C. for 8 hours. Above zeolite-clay slurry, and inorganic binder were homogeneously mixed, followed by spraying, drying. Next, after being calcined at 650° C. for 6 hours, catalyst of example 1 was formed.

The same procedure of example 1 was performed except for the different amount of samples (11.2 g of $MnCl_2.4H_2O$ was used for ZSM-5 forming, 3.1 g of $MnCl_2.4H_2O$ and, 43.8 g of $H_3PO_4$ was used for inorganic binder) to form the catalyst of example 2.

Example 3-4

4.5 g of $MnCl_2.4H_2O$ was added to 376 mL of distilled water, and 120 g of ZSM-5 was added to this solution, followed by stirring at 60° C. for 6 hours. Next, using high viscosity slurry mixer, 144 g of clay was slowly added to this solution for 3 hours. 56.7 g of Pseudo Boehmite ($Al_2O_3$ contents 72%) was dispersed in 498 g of distilled water. Next for preparing inorganic former, this dispersed Pseudo Boehmite solution, 30.5 g of 85% $H_3PO_4$ and 1.8 g of $MnCL_2.4H_2O$ were mixed at 35° C. for 8 hours. For preparing the inorganic former, 5.32 g of formic acid was added to this mixture and stirred until being stabilized. Above zeolite-clay slurry, and inorganic binder were homogeneously mixed, followed by spraying, drying. Next, after being calcined at 650° C. for 6 hours, catalyst of example 3 was formed.

The same procedure of example 3 was performed except for the different amount of samples (15.5 g of $MnCl_2.4H_2O$ was used for ZSM-5 forming, 4.8 g of $MnCl_2.4H_2O$ and, 51.3 g of $H_3PO_4$ was used for inorganic binder) to form the catalyst of example 4.

Example 5-6

4.5 g of $MnCl_2.4H_2O$ was added to 376 mL of distilled water, and 120 g of ZSM-5 was added to this solution, followed by stirring at 60° C. for 6 hours. Next, using high viscosity slurry mixer, 144 g of clay was slowly added to this solution for 3 hours. 23.6 g of water glass ($SiO_2$ 29%) was added to 199 g solution of aluminium sulfate ($Al_2O_3$ 8%), and mixed. Next for preparing inorganic binder, this solution, 15.95 g of 85% $H_3PO_4$ and 1.8 g of $MnCL_2.4H_2O$ were mixed at 35° C. for 8 hours. Above zeolite-clay slurry and inorganic binder were homogeneously mixed, followed by spraying, drying. Next, after being calcined at 650° C. for 6 hours, catalyst of example 5 was formed.

The same procedure of example 5 was performed except for the different amount of samples (11.4g of $MnCl_2.4H_2O$ was used for ZSM-5 forming, 5.8 g of $MnCl_24H_2O$ and 71.2 g of $H_3PO_4$ was used for inorganic former) to form the catalyst of example 6.

Chemical compositions of catalyst of example 1-6 are summarized in the below table 2

TABLE 2

| Catalyst | example 1 | example 2 | example 3 | example 4 | example 5 | example 6 |
|---|---|---|---|---|---|---|
| | Composition, weight % | | | | | |
| Zeolite | 37.2 | 35.9 | 36.7 | 34.8 | 40.2 | 35.5 |
| Clay | 44.7 | 43.1 | 44.1 | 41.6 | 48.1 | 42.6 |
| $Al_2O_3$ | 11.4 | 11.0 | 12.5 | 11.8 | 5.3 | 4.7 |
| $SiO_2$ | — | — | — | — | 2.3 | 2.0 |
| $P_2O_5$ | 5.8 | 8.1 | 5.8 | 9.2 | 3.3 | 13.0 |
| LaO | — | — | — | — | — | — |
| $MnO_2$ | 0.9 | 1.9 | 0.9 | 2.6 | 0.8 | 2.2 |

Example 7-8

4.5 g of $MnCl_2.4H_2O$ was added to 376 mL of distilled water, and 90 g of ZSM-5 was added to this solution, followed by stirring at 60° C. for 6 hours. Next, using high viscosity slurry mixer, 144 g of clay was slowly added to this solution for 3 hours. 62.4 g of $Al(NO_3)_3 9H_2O$ was added to 220 mL of distilled water, followed that 21.5 g of 85% $H_3PO_4$ and 1.3 g of $MnCl_2.4H_2O$ were mixed at 35° C. for 8 hours. Above zeolite-clay slurry and this solution were homogeneously mixed, followed by spraying, drying. Next, after being calcined at 650° C. for 6 hours, catalyst of example 7 was formed.

The same procedure of example 7 was performed except for the different amount of samples (120 g of ZSM-5 was used, 11.4 g of $MnCl_2.4H_2O$ was used for ZSM-5 forming, 5.8 g of $MnCl_2.4H_2O$ and 61.2 g of $H_3PO_4$ was used for inorganic former) to form the catalyst of example 8

Comparative Example 8

120 g of ZSM-5 was stirred with 376 mL of distilled water, at the room temperature for 6 hours. Next, using high viscosity slurry mixer, 144 g of clay was slowly added to this solution for 3 hours. 62.4 g of $Al(NO_3)_3 9H_2O$ was added to 220 mL of distilled water, followed by mixing with 21.5 g of 85% $H_3PO_4$. Above zeolite-clay slurry and this solution were homogeneously mixed, followed by spraying, drying. Next, after being calcined at 650° C. for 6 hours, catalyst of comparative example 8 was formed Comparative Example 9

13.2 g of 85% $H_3PO_4$ was added to the 576 mL of aqueous solution (22.8 g of $MnCl_2.4H_2O$ and 222.6 g of $AlCl_3.6H_2O$ were dissolved), followed by stirring for 3 hours. This solution was titrated with ammonia water to make pH=11. After removing the sediment, drying at 100° C., and being calcined at 650° C. for 5 hours, MnAlPOx was prepared. 32.6 g of MnAlPOx and 120 g of ZSM-5 were added to 200 g of distilled water, and mixed to form MnAlPOx/ZSM-5 slurry. For preparing the clay slurry, 111.4 g of clay and 176 g of distilled water were used with above procedure. 439 g of alumina sol (Solid contents 8.4%, pH2~3), zeolite slurry and clay slurry were homogenously mixed, followed by spraying, drying, and being calcined at 650° C. for 6 hours to form the catalyst of comparative example 9.

Chemical compositions of catalyst of example 7-8 and comparative example 8-9 are summarized in the below table 3

TABLE 3

| Catalyst | example 7 | example 8 | Comparative Example 8 | Comparative Example 9 |
|---|---|---|---|---|
| | Composition weight % | | | |
| Zeolite | 34.8 | 37.8 | 42.0 | 39.9 |
| Clay | 55.8 | 45.3 | 50.4 | 37.0 |
| $Al_2O_3$ | 3.3 | 2.7 | 3.0 | 20.0 |
| $SiO_2$ | — | — | — | — |
| $P_2O_5$ | 5.1 | 11.9 | 4.6 | 1.4 |
| LaO | — | — | — | — |
| $MnO_2$ | 1.0 | 2.38 | — | 1.7 |

※ Evaluation of Catalyst Activity ※

For evaluation of catalyst activity, 14 catalyst samples of above comparative examples 4 to 9 and examples 1 to 8 were steamed at 760□ in an atmosphere of 100% steam for 24 hours. The test conditions for evaluation was that reaction temperature was 675° C., weight hourly space velocity (WHSV) was 8/hr, 6 g of catalyst was loaded, and naphtha (Boiling point 30~135° C.) was used as reactant. Test results are summarized in Table 4~6.

From the result, it is obvious that high reaction conversion and high light olefin yield were obtained by introducing Mn and P to make the micro-spherical catalyst according to the present invention. Mn and P are effective for stabilizing zeolite, inorganic binder and clay. Also Mn and P protect the acid center of zeolite to achieve high light olefin yield.

TABLE 4

| | Comparative example 4 | Comparative example 5 | Comparative example 6 | Comparative example 7 | Comparative example 8 | Comparative example 9 |
|---|---|---|---|---|---|---|
| | Product distribution, wt % | | | | | |
| $C_2=$ | 16.5 | 14.4 | 13.5 | 13.3 | 11.2 | 14.4 |
| $C_3=$ | 19.6 | 19.4 | 19.4 | 19.2 | 18.1 | 19.2 |
| $C_2-$ | 7.8 | 7.0 | 8.5 | 6.4 | 5.6 | 7.5 |
| $C_3-$ | 4.9 | 4.3 | 6.0 | 3.2 | 2.3 | 4.1 |
| $C_4$ | 10.6 | 10.8 | 10.2 | 10.1 | 9.5 | 10.7 |
| $C_5$ (iso-$C_5$, n-$C_5$) | 7.4 | 9.3 | 10.6 | 10.6 | 12.3 | 6.8 |

TABLE 5

| | Example 1 | Example 2 | Example 3 | Example 4 | Example 5 |
|---|---|---|---|---|---|
| | Product distribution, wt % | | | | |
| $C_2=$ | 19.5 | 19.4 | 21.8 | 21.7 | 20.5 |
| $C_3=$ | 21.4 | 20.9 | 20.0 | 19.8 | 21.5 |
| $C_2-$ | 9.1 | 9.6 | 10.1 | 10.1 | 9.1 |
| $C_3-$ | 5.8 | 5.8 | 4.5 | 4.3 | 3.9 |
| $C_4$ | 9.3 | 9.7 | 7.4 | 7.3 | 8.4 |
| $C_5$ (iso-$C_5$, n-$C_5$) | 4.4 | 4.2 | 1.6 | 1.4 | 3.6 |

TABLE 6

| | Example 6 | Example 7 | Example 8 |
|---|---|---|---|
| | Product distribution, wt % | | |
| $C_2=$ | 20.8 | 21.7 | 21.9 |
| $C_3=$ | 20.3 | 21.0 | 22.3 |
| $C_2-$ | 9.8 | 9.5 | 9.8 |
| $C_3-$ | 4.7 | 3.7 | 4.1 |
| $C_4$ | 8.5 | 7.6 | 7.0 |
| $C_5$ (iso-$C_5$, n-$C_5$) | 2.0 | 2.4 | 2.4 |

As disclosed above, the catalyst according to the present invention is characterized in that for achieving high yield of light olefin, zeolite acid point is treated with Mn, and in order for thus treated zeolite to achieve high activity in the catalyst structure, P and Mn are used to stabilize the inorganic oxide binder and matrix component. The present method for preparing catalyst has advantages from the point of expense comparing the prior art which generally comprises complicated imbedding steps for zeolite.

The invention claimed is:

1. A method for preparing a catalyst for light olefins comprising the steps of:
   (a) mixing ZSM-5 zeolite, clay and inorganic oxide precursor with phosphorus precursor and manganese precursor under stirring to prepare a mixing slurry; and
   (b) spray drying the mixing slurry, followed by calcinations, to obtain a final catalyst wherein the step (a) comprises the steps of:
      (i) mixing the ZSM-5 zeolite with manganese precursor, followed by adding the clay and stirring the mixture to prepare a ZSM-5 zeolite/clay slurry;
      (ii) mixing the inorganic precursor with phosphorus precursor and manganese precursor under stirring to prepare an inorganic oxide slurry; and
      (iii) mixing the ZSM-5 zeolite/clay slurry and the inorganic oxide slurry uniformly;

wherein both 0.01-5.0 wt % $MnO_2$ and 1-15 wt % of $P_2O_5$ are embedded in each of 1-50 wt % of ZSM-5 zeolite, 21-70 wt % of clay, and 1-40 wt % of an inorganic oxide in the final catalyst.

2. A method for preparing a catalyst for light olefins comprising the steps of:
 (a) mixing ZSM-5 zeolite, clay and inorganic oxide precursor with phosphorus precursor and manganese precursor under stirring to prepare a mixing slurry; and
 (b) spray drying the mixing slurry, followed by calcinations, wherein the step (a) comprises the steps of:
  (i) mixing the ZSM-5 zeolite with manganese precursor to prepare a zeolite slurry;
  (ii) mixing the inorganic precursor with phosphorus precursor and manganese precursor under stirring to prepare an inorganic oxide slurry; and
  (iii) mixing the ZSM-5 zeolite slurry, the inorganic oxide slurry, and clay uniformly;
 wherein both 0.01-5.0 wt % $MnO_2$ and 1-15 wt % of $P_2O_5$ are embedded in each of 1-50 wt % of ZSM-5 zeolite, 21-70 wt % of clay, and 1-40 wt % of an inorganic oxide in the final catalyst.

3. A method for preparing a catalyst for light olefins comprising the steps of:
 (a) mixing ZSM-5 zeolite, clay and inorganic oxide precursor with phosphorus precursor and manganese precursor under stirring to prepare a mixing slurry; and
 (b) spray drying the mixing slurry, followed by calcinations to obtain a final catalyst,
 wherein the step (a) is carried out by mixing the ZSM-5 zeolite, clay and inorganic oxide precursor, phosphorus precursor and manganese precursor at the same time under stirring
 wherein both 0.01-5.0 wt % $MnO_2$ and 1-15 wt % of $P_2O_5$ are embedded in each of 1-50 wt % of ZSM-5 zeolite, 21-70 wt % of clay, and 1-40 wt % of an inorganic oxide in the final catalyst.

4. The method of claim 1, wherein the inorganic oxide precursor comprises $Al_2O_3$, $SiO_2$ or $Al_2O_3$—$SiO_2$, and forms a sol, gel, or solution.

5. The method of claim 1, wherein the manganese precursor is a sulfate, nitrate, chloride or acetate compound of manganese.

6. The method of claim 1, wherein the phosphorus precursor is an aqueous phosphorus compound selected from the group of $H_3PO_4$, $(NH_4)_3PO_4$, $H(NH_4)_2(PO_4)$ and $H_2(NH_4)PO_4$.

7. The method of claim 2, wherein the inorganic oxide precursor comprises $Al_2O_3$, $SiO_2$ or $Al_2O_3$—$SiO_2$, and forms a sol, gel, or solution.

8. The method of claim 3, wherein the inorganic oxide precursor comprises $Al_2O_3$, $SiO_2$ or $Al_2O_3$—$SiO_2$, and forms a sol, gel, or solution.

9. The method of claim 2, wherein the manganese precursor is a sulfate, nitrate, chloride or acetate compound of manganese.

10. The method of claim 3, wherein the manganese precursor is a sulfate, nitrate, chloride or acetate compound of manganese.

11. The method of claim 2, wherein the phosphorus precursor is an aqueous phosphorus compound selected from the group of $H_3PO_4$, $(NH_4)_3PO_4$, $H(NH_4)_2(PO_4)$ and $H_2(NH_4)PO_4$.

12. The method of claim 3, wherein the phosphorus precursor is an aqueous phosphorus compound selected from the group of $H_3PO_4$, $(NH_4)_3PO_4$, $H(NH_4)_2(PO_4)$ and $H_2(NH_4)PO_4$.

\* \* \* \* \*